US006470416B2

(12) United States Patent
Chang

(10) Patent No.: US 6,470,416 B2
(45) Date of Patent: *Oct. 22, 2002

(54) METHOD AND SYSTEM FOR CONTROLLING THE MEMORY ACCESS OPERATION BY CENTRAL PROCESSING UNIT IN A COMPUTER SYSTEM (2)

(75) Inventor: Nai-Shung Chang, Taipei Hsien (TW)

(73) Assignee: Via Technologies, Inc., Taipei Hsien (TW)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/336,012

(22) Filed: Jun. 18, 1999

(65) Prior Publication Data

US 2002/0062421 A1 May 23, 2002

(30) Foreign Application Priority Data

Mar. 2, 1999 (TW) ........................................ 88103132 A

(51) Int. Cl.[7] .............................................. G06F 12/00
(52) U.S. Cl. ........................................ 711/105; 711/167
(58) Field of Search .................................. 711/167, 143, 711/146, 118, 119, 120, 121, 105

(56) References Cited

U.S. PATENT DOCUMENTS

| | | | | |
|---|---|---|---|---|
| 5,715,421 A | * | 2/1998 | Akiyama et al. | 365/203 |
| 5,787,457 A | * | 7/1998 | Miller et al. | 711/105 |
| 5,813,036 A | * | 9/1998 | Ghosh et al. | 711/146 |
| 5,819,105 A | * | 10/1998 | Moriarty et al. | 710/5 |
| 5,960,459 A | * | 9/1999 | Thome et al. | 711/154 |
| 6,035,369 A | * | 3/2000 | Ware et al. | 711/105 |
| 6,104,417 A | * | 8/2000 | Nielsen et al. | 345/521 |
| 6,181,619 B1 | * | 1/2001 | Bogin et al. | 365/203 |
| 6,199,145 B1 | * | 3/2001 | Ajanovic et al. | 711/149 |
| 6,253,297 B1 | * | 6/2001 | Chauvel et al. | 711/167 |
| 6,272,594 B1 | * | 8/2001 | Gupta et al. | 711/127 |

OTHER PUBLICATIONS

Rambus Technology Guide Architectural View, Preliminary, Revision 0.90, May 4, 1992, pp. 1–140.*
Doggett et al., "A Low–Cost Memory Architecture for PCI–Based Interactive Ray Casting", Proceedings of the 1999 Eurographics/SIGGRAPH Workshop on Graphics Hardware, 1999.*

* cited by examiner

Primary Examiner—Matthew Kim
Assistant Examiner—Pierre Michel Bataille
(74) Attorney, Agent, or Firm—J.C. Patents

(57) ABSTRACT

A memory access control method and system is provided for use on a computer system having a CPU and a memory unit for controlling the memory access operation by the CPU to the memory unit. The memory unit is of the type having an auto-precharge feature. By this method and system, a CPU interface is coupled to the CPU, which is capable of promptly issuing an internal read-request signal in response to each read request from the CPU and is further capable of generating a cross-page signal concurrently with the internal read-request signal in the event that the data requested by the read request are located in a closed page in the memory unit. Furthermore, a memory control unit is coupled between the CPU interface and the memory unit, which is capable of issuing a normal read-enable signal to the memory unit in the event that the next internal read-request signal is received without having an accompanying cross-page signal before the read operation for the current read request is performed, and is further capable of issuing a read-with-auto-precharge enable signal to the memory unit in the event that the next internal read-request signal is received together with an accompanying cross-page signal before the read operation for the current read request is performed, the read-with-auto-precharge enable signal causing the memory unit to perform an auto-precharging operation after the read operation for the current read request is completed.

11 Claims, 12 Drawing Sheets

METHOD AND SYSTEM FOR CONTROLLING THE MEMORY ACCESS OPERATION BY CENTRAL PROCESSING UNIT IN A COMPUTER SYSTEM (2)

CROSS-REFERENCE TO RELATED APPLICATION

This application claims the priority benefit of Taiwan application serial no. 88103132, filed Mar. 2, 1999, the full disclosure of which is incorporated herein by reference.

BACKGROUND OF THE INVENTION

1. Field of the Invention

This invention relates to a computer memory access technique, and more particularly, to a method and system for use on a computer system to control a memory access operation by a central processing unit (CPU) of a memory unit in a more efficient manner by means of transferring each read request promptly to the memory unit without waiting until the L1 write-back signal for the read request is issued, and also by means of utilizing the auto-precharge feature of the memory unit.

2. Description of Related Art

In this information age, computers have become an indispensable data processing tool in all walks of life. In the use of computers, performance is a primary concern. Many factors can affect the performance of a computer system, including the speed of the CPU, the type of the primary memory being used, efficiency of memory access control, and so forth. Presently, dynamic random-access memory (DRAM) is widely used as the primary memory of most computer systems. Conventional memory access methods that can help boost computer performance include, for example, the Fast Page Mode (FPM) method and the Extended Data Out (EDO) method. Moreover, a new type of DRAM, called synchronized DRAM (SDRAM), allows high-speed access to the data stored therein.

FIG. 1 is a schematic block diagram of the system configuration of a conventional memory access control method and system, as indicated by the reference numeral 120, which is designed to control the memory access operation by a CPU 110 of a memory unit 130.

The memory access control system 120 is coupled between the CPU 110 and the memory unit 130 and is composed of a CPU interface 121 and a memory control unit 122. The CPU 110 further includes a cache memory 112. The CPU 110 and the CPU interface 121 are interconnected via a number of data lines ADS, REQ, HITM, HA, HD, DBSY, and DRDY; the CPU interface 121 and the memory control unit 122 are interconnected via two data lines DADS and DAT; and the memory control unit 122 and the memory unit 130 are interconnected via three data lines CMD, MD, and CS0.

The access operation by the CPU 110 of the memory unit 130, whether read or write, is controlled by the memory access control system 120. The data communication between the CPU 110 and the memory control unit 122 is controlled by the CPU interface 121. When the CPU 110 wants to gain access to the memory unit 130, it issues access requests via the CPU interface 121 to the memory control unit 122. In the case of a write operation, the memory control unit 122 is used to control the writing of the output data from the CPU 110 into the memory unit 130. In the case of a read operation, the memory control unit 122 controls the retrieval of the CPU-requested data from the memory unit 130 and then transfers the retrieved data via the CPU interface 121 to the CPU 110.

When the CPU 110 wants to gain access to the memory unit 130, it first sets the ADS data line at a LOW-voltage logic state. Whether the intended access operation is write or read is indicated by the logic voltage state of the REQ data line. Moreover, whether the request is a hit or a miss to the cache memory 112 is indicated by the logic voltage state of the HITM data line. For instance, in the case of a cache hit, the HITM data line is set at a LOW-voltage logic state, whereas in the case of a cache miss, the HITM data line is set at a HIGH-voltage logic state (the signal on the HITM data line is hereinafter referred to an L1 write-back signal). When the DRDY and DBSY data lines are set at A LOW-voltage logic state, this indicates that the CPU interface 121 wants to transfer data via the HD data line to the CPU 110. Moreover, the HA data line is used to transfer address signals from the CPU 110.

Furthermore, the CPU interface 121 and the memory control unit 122 use the DADS and DAT data lines for internal data communication therebetween. The DADS signal is a converted version of the ADS signal from the CPU 110. The DAT data line is used to transfer the output data from the CPU 110 that are to be written into the memory unit 130, or the data that are retrieved from the memory unit 130 and to be transferred via the CPU interface 121 to the CPU 110.

The memory control unit 122 and the memory unit 130 use the CMD, MD, and CS0 data lines for data communication therebetween. The CMD data line is used to transfer access control signals issued by the memory control unit 122 to the memory unit 130; the MD data line is used to transfer memory data to and from the memory unit 130; and the CS0 data line is used to transfer a chip-select signal to the memory unit 130. The chip-select signal is enabled when the CS0 data line is set at a LOW-voltage logic state.

The storage space of the memory unit 130 is partitioned into a plurality of pages 135. To read data from the memory unit 130, the CPU 110 issues a number of read requests successively to the CPU interface 121. If any one of the read requests is a hit to the cache memory 112, the CPU 110 uses the HITM data line to issue an L1 write-back signal to indicate such a condition to the memory control unit 122, and in which case, a cache write-back operation is performed to write the cache data back into the memory unit 130. Typically, the L1 write-back signal of each read request is issued several clock cycles after the read request is issued. The conventional memory access control system 120 operates in such a manner that, for each read request from the CPU 110, the CPU interface 121 waits until the L1 write-back signal of the current read request is received and then send out the corresponding internal read-request signal to the memory control unit 122. In response to this internal read-request signal, the memory control unit 122 then performs a read operation to retrieve the requested data from the memory unit 130 and then transfers the retrieved data via the CPU interface 121 to the CPU 110.

Presently, SDRAM is widely used to implement the memory unit 130. The SDRAM comes with many advanced features, such as the auto-precharge feature which allows the SDRAM to undergo an auto-precharging operation after the completion of a read operation. The auto-precharge feature can help reduce the time required for precharging the SDRAM. However, this feature is not utilized by the conventional memory access control system 120 shown in FIG. 1 to help enhance its memory access performance.

As a conclusion, there are two drawbacks to the prior art. First, there exists a waiting period for the CPU interface 121 to issue the internal read-request signal to the memory control unit 122 until the CPU 110 issues the L1 write-back signal of the current read request; and second, the advanced auto-precharge feature of SDRAM is not fully utilized to help enhance memory access performance. The overall system performance of a computer system using the prior art is therefore poor and there is still room for improvement. Typically, the overall memory access operation performed by a CPU includes 60% read operation, 15% cache write-back, and 25% write operation. Therefore, the overall system performance of a computer system can be enhanced solely by increasing the speed of the read operation. The conventional method and system of FIG. 1, however, is low in read operation since it frequently must wait for L1 write-back signals and requires a long period to precharge the memory unit.

SUMMARY OF THE INVENTION

It is therefore an objective of the present invention to provide an improved memory access control method and system for use on a computer system, which can help increase the speed of the read operation by the CPU by means of transferring each read request promptly to the memory unit without waiting until the L1 write-back signal of the read request is issued, so that the overall system performance of the computer system can be enhanced.

It is another objective of the present invention to provide an improved memory access control method and system for use on a computer system, which can help increase the speed of the read operation by the CPU by means of utilizing the auto-precharge feature of the memory unit for the purpose of reducing the time required to precharge the memory unit, so that the overall system performance of the computer system can be enhanced.

In accordance with the foregoing and other objectives of the present invention, an improved memory access control method and system is provided for use on a computer system to control the memory access operation by the CPU of the memory unit in a more efficient manner.

The memory access control system of the invention includes the following constituent parts: (a) a CPU interface coupled to the CPU, which is capable of promptly issuing an internal read-request signal in response to each read request from the CPU and is further capable of generating a cross-page signal concurrently with the internal read-request signal in the event that the data requested by the current read request are located in a closed page in the memory unit; and (b) a memory control unit coupled between the CPU interface and the memory unit, which is capable of issuing a normal read-enable signal to the memory unit in the event that the next internal read-request signal is received without having an accompanying cross-page signal before the read operation for the current read request is performed, and is further capable of issuing a read-with-auto-precharge enable signal to the memory unit in the event that the next internal read-request signal is received together with an accompanying cross-page signal before the read operation for the current read request is performed, the read-with-auto-precharge enable signal causing the memory unit to perform an auto-precharging operation after the read operation for the current read request is completed.

The memory access control method of the invention includes the following steps: (1) in response to the current read request from the CPU, issuing a normal read-enable signal to the memory unit to enable the memory unit to perform a read operation for the current read request; and (2) in the event that the next read request is received before the read operation for the current read request signal is performed and that the data requested by the next read request are located in a closed page in the memory unit, issuing a read-with-auto-precharge enable signal to the memory unit to enable the memory unit to perform an auto-precharging operation after the read operation for the current read request is completed.

The foregoing method and system of the invention is characterized by the prompt transfer of each read request from the CPU to the memory control unit, right after it is issued and without waiting until the CPU issues the L1 write-back signal of the current read request. Moreover, the method of the invention is further characterized in that, in the event that the data requested by the next read request are located in a closed page, the memory control unit issues a read-with-auto-precharge enable signal rather than a normal read-enable signal for the current read request. Therefore, the invention can help reduce the waiting periods required by the CPU and also help reduce the period of precharging operations. As a result, the overall memory access performance by the CPU can be enhanced. The overall system performance of the computer system is also enhanced.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 2:
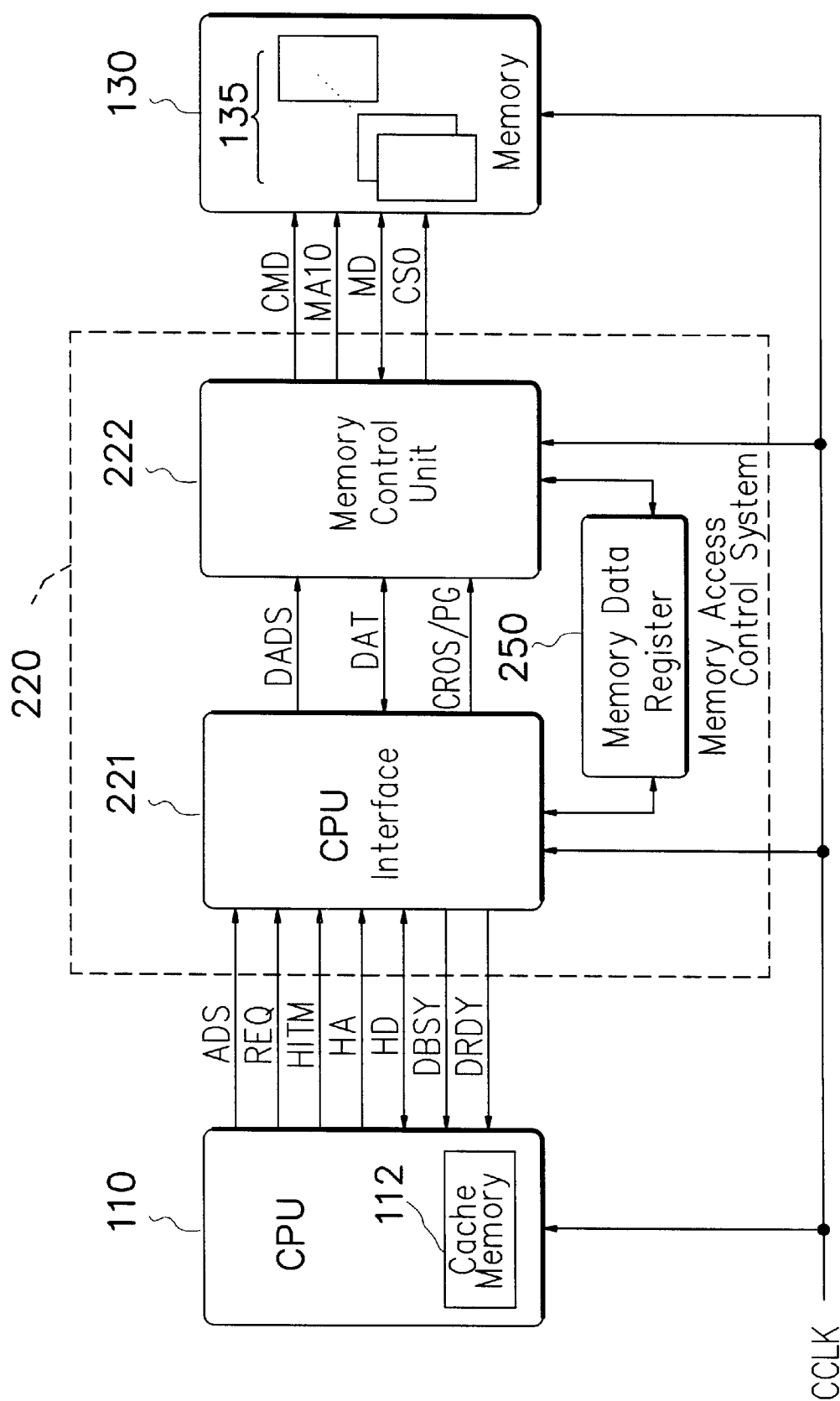
FIG. 2 is a schematic block diagram of the memory access control method and system according to the invention for controlling the memory access operation by a CPU to a memory unit.

FIG. 2 is a schematic block diagram of the system configuration of the memory access control method and system according to the invention, as here indicated by the reference numeral 220, which is designed to control the memory access operation by a CPU (here also indicated by the reference numeral 110) on a memory unit (here also indicated by the reference numeral 130).

The memory access control system 220 of the invention is coupled between the CPU 110 and the memory unit 130 and is composed of a CPU interface 221 and a memory control unit 222. The CPU 110 further includes a cache memory 112. The CPU 110 can be, for example, a Pentium II CPU from Intel Corporation in the U.S.A., while the memory unit 130 can be, for example, an SDRAM. The storage space of the memory unit 130 is partitioned into a number of memory pages 135. Each page should be opened before it can be accessed.

The CPU 110 and the CPU interface 221 are interconnected via a number of data lines: ADS, REQ, HITM, HA, HD, DBSY, and DRDY; the CPU interface 221 and the memory control unit 222 are interconnected via three data lines: DADS, DAT, and CROS/PG; and the memory control unit 222 and the memory unit 130 are interconnected via four data lines: CMD, MA10, MD, and CS0. The system of the invention shown in FIG. 2 is distinguished from the prior art of FIG. 1 particularly by the additional provision of the CROS/PG data line between the CPU interface 221 and the memory control unit 222 and the additional provision of the MA10 data line between the memory control unit 222 and the memory unit 130.

The CPU 110 can gain access to the memory unit 130 under control of the memory access control system 220. The access operation can be either read, cache write-back, or write. When the CPU 110 wants to gain access to the memory unit 130, it issues access requests to the CPU interface 221. In the case of a write operation, the memory control unit 222 is used to control the writing of the output data from the CPU 110 into the memory unit 130; and in the case of a read operation, the memory control unit 222 controls the retrieval of the CPU-requested data from the memory unit 130 and then transfers the retrieved data via the CPU interface 221 to the CPU 110.

Figure 1:
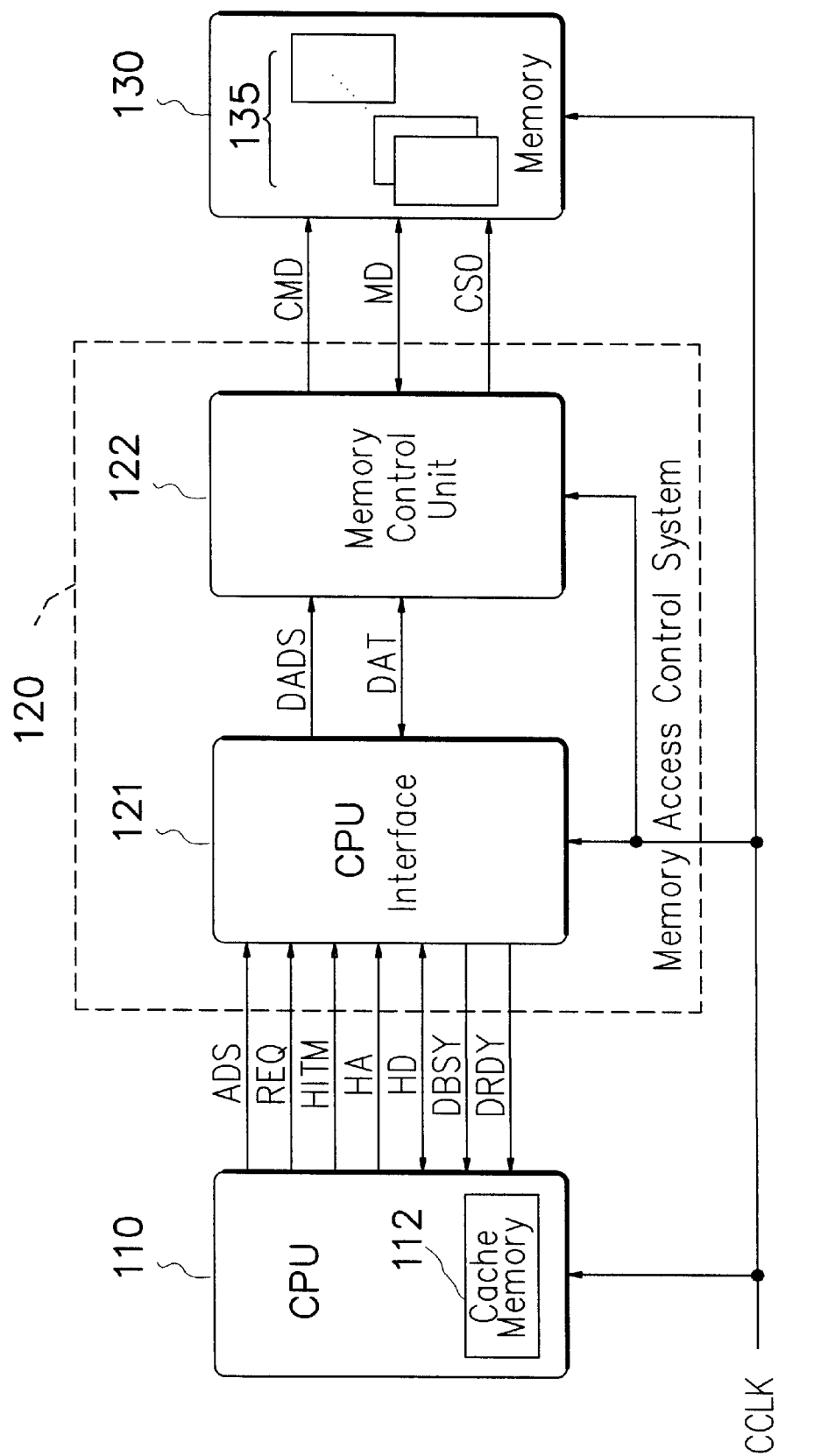
FIG. 1 is a schematic block diagram of a conventional memory access control method and system for controlling the memory access operation by a CPU to a memory unit.

The foregoing system configuration of FIG. 2 is largely the same as that of the prior art of FIG. 1. However, the method and system of the invention operates in a distinguishably different manner from the prior art of FIG. 1. In the system configuration of FIG. 2, only major data lines that are related to the spirit and scope of the invention are drawn, and nonessential ones are eliminated for simplification of the drawings and description.

In FIG. 2, all the units are driven by a common clock signal CCLK. The CPU 110 and the CPU interface 221 use the data lines ADS, REQ, HITM, HA, HD, DBSY, and DRDY for data communication therebetween. It is to be noted that, although in FIG. 2 each data line is shown as a single line, it can actually be a data bus consisting of a number of lines. For example, in the case of the CPU 110 being a 64-bit CPU, the HD data line is a 64-line data bus. Moreover, in the following disclosure of the preferred embodiment, the designation of a certain signal as either a LOW-voltage logic state and a HIGH-voltage logic state is an alterable design choice and not intended to limit the scope of the invention.

When the CPU 110 wants to gain access to the memory unit 130, it sets the ADS data line at a LOW-voltage logic state, and meanwhile, whether the requested access operation is write or read is indicated by the logic voltage state of the REQ data line. Moreover, whether a read request is a hit or a miss to the cache memory 112 is indicated by the logic voltage state of the HITM data line. For instance, if the current read request is a cache hit, the HITM data line is set at a LOW-voltage logic state, indicating that the cache data in the cache memory 112 have been updated and are to be written back to the memory unit 130, whereas if the request is a miss, the HITM data line is set at a HIGH-voltage logic state (the signal on the HITM data line is hereinafter referred to an L1 write-back signal). In the case of a hit, a cache write-back operation is performed to write the cache data back into the memory unit 130. When the DRDY and DBSY data lines are set at A LOW-voltage logic state, this indicates that the CPU interface 221 wants to transfer data over the HD data line to the CPU 110. Moreover, the HA data line is used to transfer the output address signals from the CPU 110.

Inside the memory access control system 220, the CPU interface 221 and the memory control unit 222 use the DADS, DAT, and CROS/PG data lines for the internal data communication therebetween. The DADS signal is a converted version of the ADS signal from the CPU 110. The CROS/PG data line is used to transfer a cross-page signal issued by the CPU interface 221 to the memory control unit 222 if the requested data are located in a closed page in the memory unit 130. The DAT data line is used to transfer the output data from the CPU 110 that are to be written into the memory unit 130, or the retrieved data from the memory unit 130 that are be transferred via the CPU interface 221 to the CPU 110.

The memory control unit 222 and the memory unit 130 use the CMD, MA10, MD, and CS0 data lines for the data communication therebetween. The CMD data line is used to transfer various access control signals to the memory unit 130 for various read operations. These control signals include a precharge-enable signal, an activate-enable signal, a read-enable signal, and a write-enable signal. The MA10 data line is used to transfer an auto-precharge enable signal to the memory unit 130, in such a manner that when the MA10 data line is set at a LOW-voltage logic state, it causes the current read operation to be carried out without performing an auto-precharging operation, whereas when set at A HIGH-voltage logic state, it causes an auto-precharging operation to be performed immediately after the current read operation is completed. In the case of the memory unit 130 being a 16 Mb (megabit) SDRAM with address lines A0–A11, the MA10 data line can be implemented by the A10 address line. The MD data line is used to transfer the memory data to and from the memory unit 130. The CS0 data line is used to transfer a chip-select signal from the memory control unit 222 to the memory unit 130. When the CS0 data line is set at a LOW-voltage logic state, this indicates the memory control unit 222 wants to select the memory unit 130 for some access control operations; for instance, when the memory control unit 222 wants to issue an access control signal via the CMD data line to the memory unit 130.

Moreover, a memory data register circuit 250 coupled between the memory control unit 222 and the CPU interface 221 is used to store all address information of each page. In a computer system, users can install several register modules according to the actual need so that the memory unit 130 usually includes several registered pages. As the computer system is turned on, the memory control unit 222 searches for the installed register modules and find out the total number and their locations also. The memory control unit 222 then stores each page information, such as the address information.

Both the memory control unit 222 and the CPU interface 221 can access the memory data register circuit 250. As the system is activated, the memory control unit 222 fetches the information of the memory unit 130 and stores it to the memory data register circuit 250. As the CPU 110 issues an access request, the CPU interface 221, according to the address information in the memory data register circuit 250, can judge to see if the address of the current request and the address of the previous request are at the same registered page or not. If the current request address is on a different registered page, as the CPU interface 221 sends the access request to the memory control unit 222, it simultaneously issues a CROS/PG signal to open a new page in the memory unit 130 for uses of the request of the CPU 110.

Figure 3:
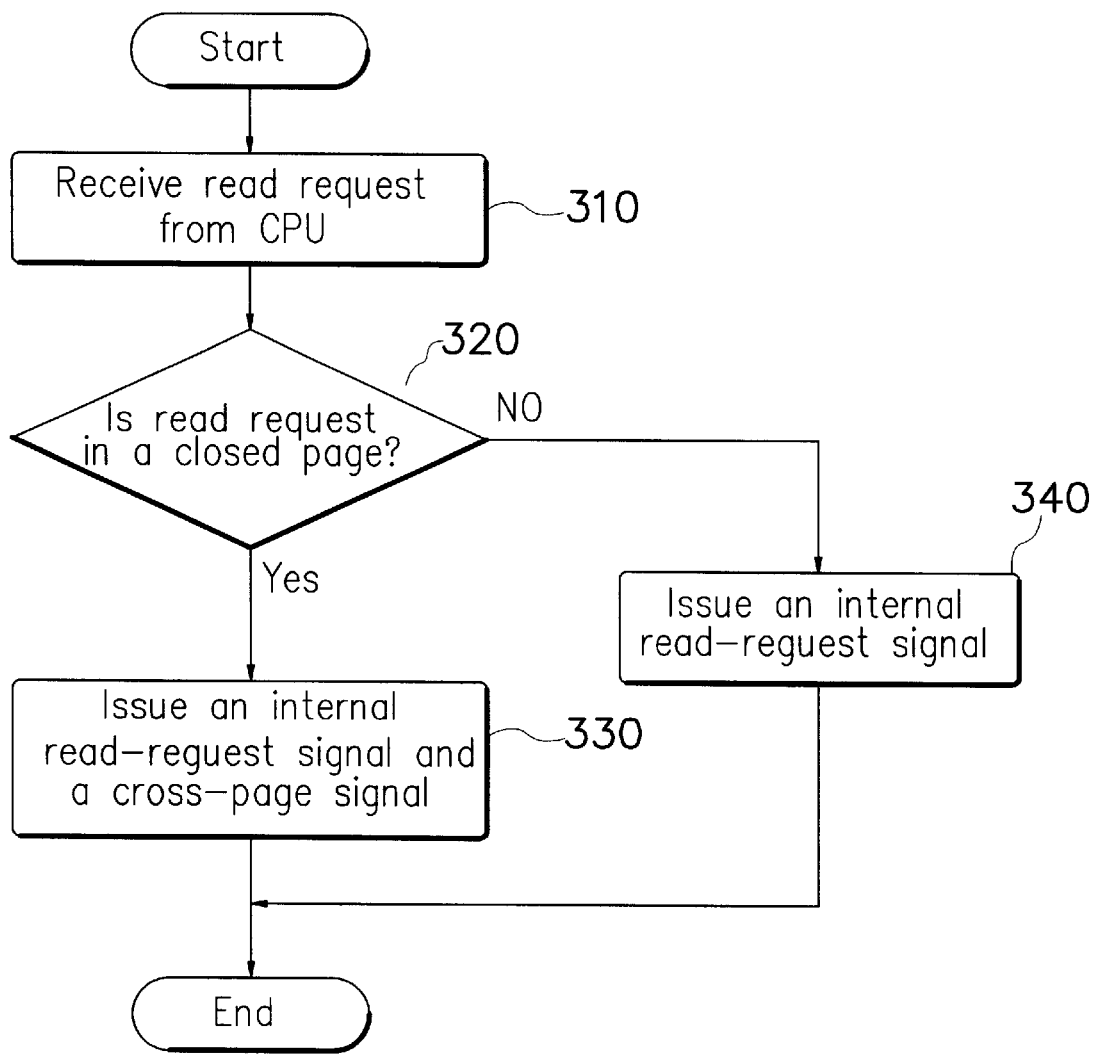
FIG. 3 is a flow chart of the procedural steps carried out by the CPU interface utilized in the memory access control system of the invention shown in FIG. 2.
Figure 4:
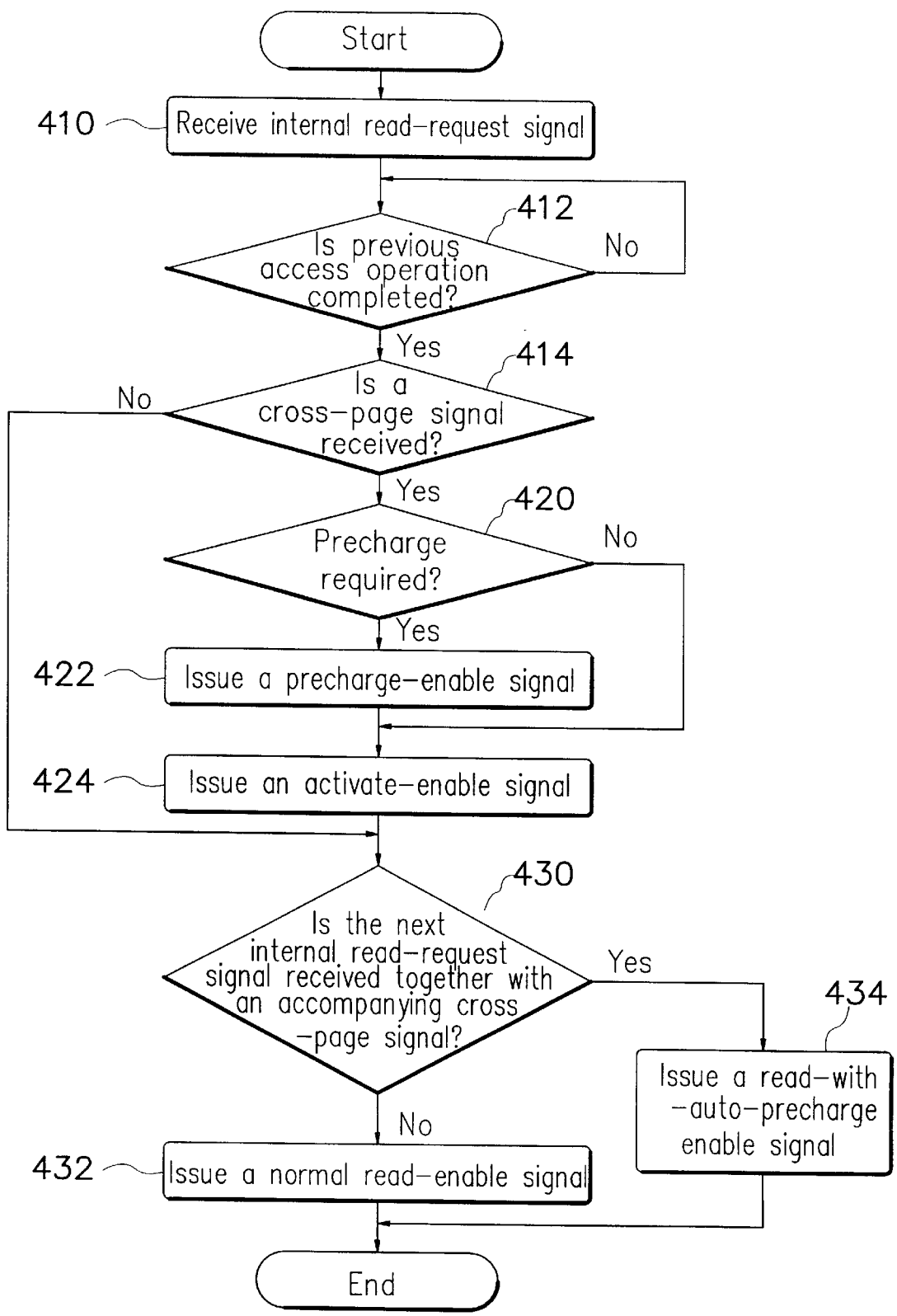
FIG. 4 is a flow chart of the procedural steps carried out by the memory control unit utilized in the memory access control system of the invention shown in FIG. 2.

FIG. 3 is a flow chart of the procedural steps carried out by the CPU interface 221 in response to each read request from the CPU 110; and FIG. 4 is a flow chart of the procedural steps carried out by the memory control unit 222 in response to the internal read-request signal from the CPU interface 221.

Referring to FIG. 3 together with FIG. 2, in the first step 310, the CPU interface 221 receives a read request from the CPU 110 via the ADS, HA, and REQ data lines. In most cases, a number of read requests are issued successively.

In the next step 310, the CPU interface 221 checks whether the requested data are located in a closed page (off page) in the memory unit 130. If YES, the procedure goes to step 330, whereas if NO (indicating that the requested data are located in a currently opened page (on page), the procedure goes to step 340.

In step 330, the CPU interface 221 issues an internal read-request signal and a cross-page signal respectively via the DADS and the CROS/PG data lines to the memory control unit 222. The procedure is then ended.

In step 340, the CPU interface 221 issues solely the internal read-request signal without cross-page signal to the memory control unit 222. The procedure is then ended.

The foregoing procedure shows the actions carried out by the CPU interface 221 in response to one read request from the CPU 110. When the CPU 110 successively issues a number of read requests, the CPU interface 221 performs the same procedural steps shown in FIG. 3 for each of the read requests.

Subsequently, the actions carried out by the memory control unit 222 in response to an internal read-request signal or the combination of an internal read-request signal and a cross-page signal from the CPU interface 221 are shown in FIG. 4.

Referring to FIG. 4 together with FIG. 2, in the first step 410, the memory control unit 222 receives an internal read-request signal from the CPU interface 221 via the DADS data line.

In the next step 412, the memory control unit 222 checks whether the previous memory access operation, either read or write, is completed. If YES, the procedure goes to step 414; if NO, the memory control unit 222 continues the action of step 412 until the result is YES.

In step 414, the memory control unit 222 checks whether a cross-page signal is received via the CROS/PG data line from the CPU interface 221 at the same time when the internal read-request signal is received via the DADS data line from the CPU interface 221. If YES, this indicates that the requested data are located in a closed page, and the procedure goes to step 420; if NO, this indicates that the requested data are located in an opened page, and the procedure jumps to step 430.

In step 420, the memory control unit 222 checks whether the memory unit 130 needs to undergo a precharging operation (the memory unit 130 requires no further precharging operation provided that the previous read operation is carried out with auto-precharging operation; otherwise, the memory unit 130 requires a precharging operation for the current read request). If YES, the procedure goes to step 422; if NO, the procedure jumps to step 424.

In step 422, the memory control unit 222 issues a precharge-enable signal to the memory unit 130, which causes the memory unit 130 to undergo a precharging operation. The procedure then goes to step 424.

In step 424, after the precharging process is completed, the memory control unit 222 then issues an activate-enable signal to the memory unit 130, which causes the memory unit 130 to open the page where the requested data are located. Before actually retrieving the requested data from the opened page, the procedure first goes to step 430, in which the memory control unit 222 checks whether the next internal read-request signal is received together with a cross-page signal. If YES, the procedure goes to step 434; if NO (either the next internal read-request signal is received without cross-page signal, or the next internal read-request signal is not yet received), the procedure goes to step 432.

In step 432, the memory control unit 222 issues a normal read-enable signal to the memory unit 130, which causes the memory unit 130 to merely output the requested data without further performing an auto-precharging operation after outputting the requested data is completed. The procedure is then ended.

In step 434, the memory control unit 222 issues a read-with-auto-precharge enable signal to the memory unit 130, which causes the memory unit 130 first to output the requested data and then to perform an auto-precharging operation immediately after outputting the requested data is complete. The procedure is then ended.

In the following, some performance comparison examples are used to better explain the advantages of the invention over the prior art. The signal timing diagrams of these examples are respectively shown in FIGS. 5A–5B, FIGS. 6A–6B, FIGS. 7A–7B, and FIGS. 8A–8B for performance comparison between the prior art and the invention (note that FIG. 5A, FIG. 6A, FIG. 7A, and FIG. 8A are the signal timing diagrams of the prior art, while FIG. 5B, FIG. 6B, FIG. 7B, and FIG. 8B are those of the invention).

In the following examples, both for the invention and the prior art, it is assumed that the burst length of each read request from the CPU 110 is four blocks of data, and the latency of the memory unit 130 is two clock cycles. In FIG. 5B, FIG. 6B, FIG. 7B, and FIG. 8B of the invention, each read-with-auto-precharge enable signal is marked out with slashes for emphasis purpose.

Figure 5A:
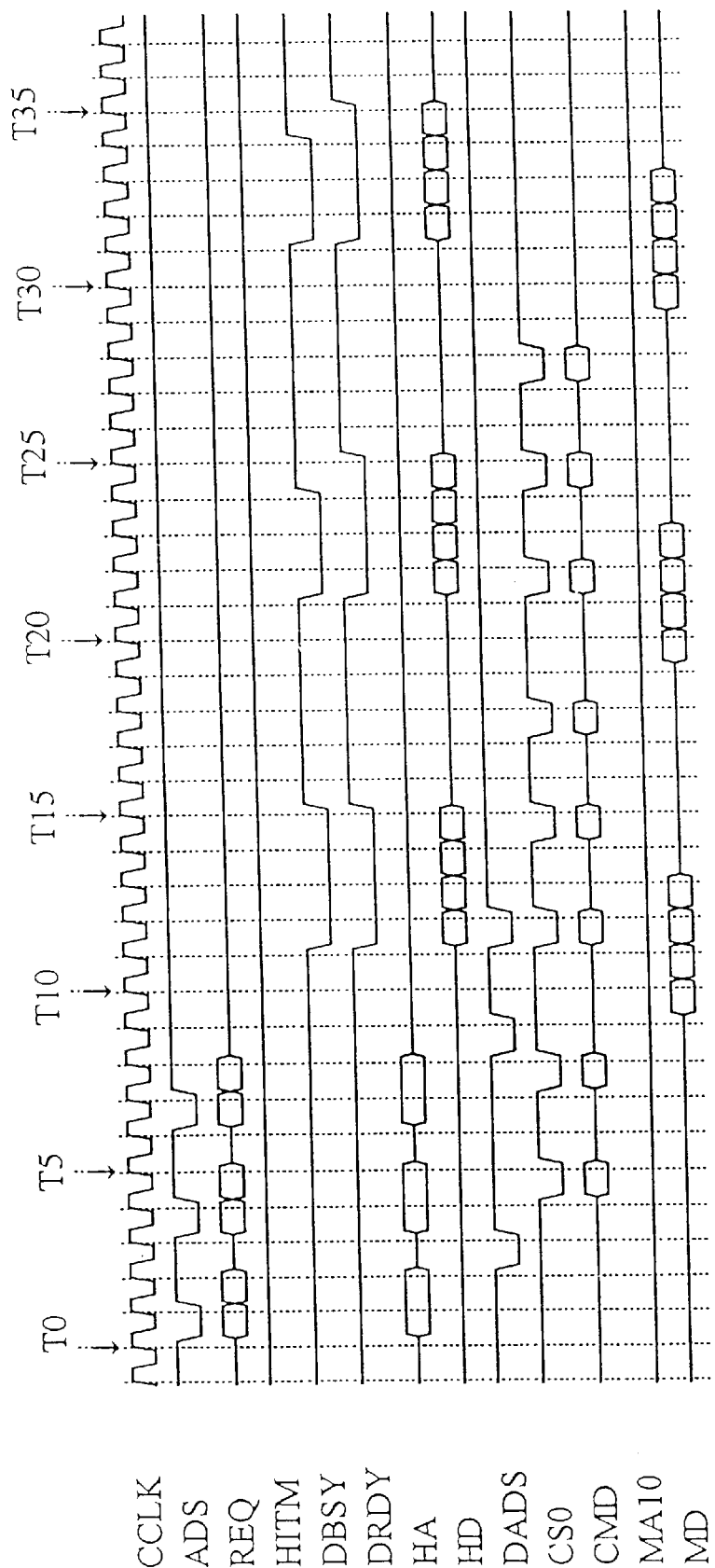
FIGS. 5A–5B are signal timing diagrams of the prior art and the invention, respectively, which are used to depict a first performance comparison example between the invention and the prior art.
Figure 5B:
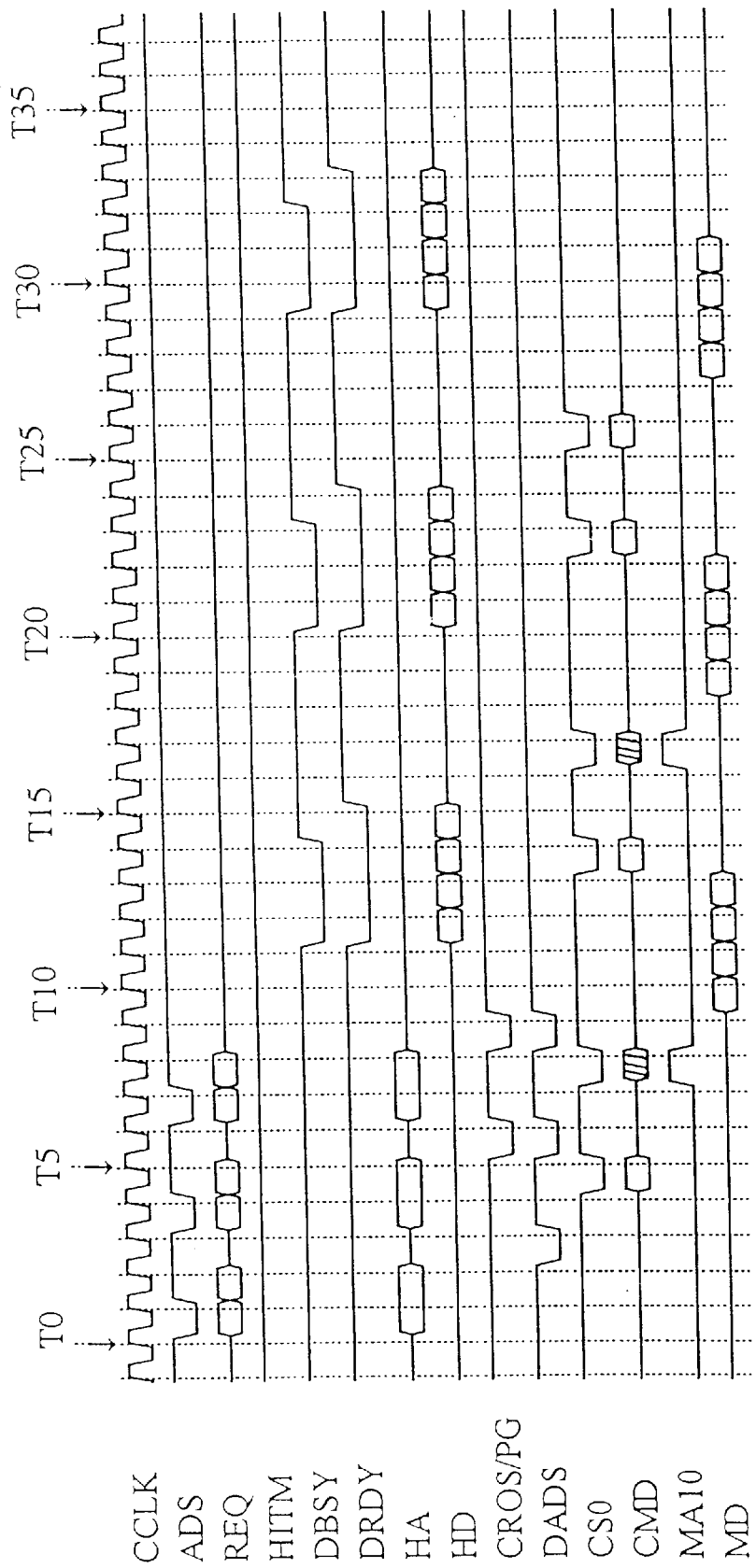

First Performance Comparison Example (FIGS. 5A and 5B)

In the example of FIGS. 5A–5B, it is assumed that the CPU 110 successively issues three read requests to the memory unit 130, with the data requested by the first read request being located in the start page in the memory unit 130, and the data requested by the second and third read requests being respectively located in closed pages in the memory unit 130.

Referring to FIG. 5A (the prior art), in the case of the prior art, the CPU 110 issues three read requests successively at T1, T4, and T7 via the ADS and REQ data lines. For each read request, the CPU 110 issues an L1 write-back signal indicative of whether the read request is a hit or a miss to the cache memory 112 in four clock cycles after the read request is issued. The L1 write-back signal is issued via the HITM data line to the CPU interface 121. Therefore, for the first read request issued at T1, its L1 write-back signal is issued at T5 via the HITM data line; for second the read request issued at T4, its L1 write-back signal is issued at T8 via the HITM data line; and for the third read request issued at T7, its L1 write-back signal is issued at T1 via the HITM data line.

By the prior art of FIG. 1, when the CPU interface 121 receives the first read request from the CPU 110, which is, for example, assumed to be not a write-back request in order to reduce a time delay in timing diagrams for easy descriptions, the CPU interface 121 promptly issues at T3 the corresponding internal read-request signal to the memory control unit 122 without waiting until the CPU 110 issues the L1 write-back signal of the first read request. For the second and third read requests, the CPU interface 121 waits until the CPU 110 issues the respective L1 write-back signals for these two read requests, respectively at T9 and T12, and then issues the corresponding internal read-request signals to the memory control unit 122.

The memory control unit 122, in response to the first internal read-request signal from the CPU interface 121, first checks that the requested data are located in the start page of the memory unit 130; then, after two clock cycles, i.e., at T5, the memory control unit 122 issues successively an activate-enable signal and a read-enable signal to the memory unit 130. After a latency of two clock cycles, i.e., at T10, the memory unit 130 starts to output the requested four blocks of data via the MD data line. These data are then transferred via the memory access control system 120 to the CPU 110. With respect to the second read request, the memory control unit 122 receives the second internal read-request signal from the CPU interface 121 at T9. In response, the memory control unit 122 first checks that the requested data are located in a closed page; then, the memory control unit 122 waits until the memory unit 130 completes outputting the third block of data requested by the previous read request, i.e., until T12, and then issues successively a precharge-enable signal, an activate-enable signal, and a read-enable signal to the memory unit 130. In response, the memory unit 130 starts at T19 to output the four blocks of data requested by the second read request. Furthermore, with respect to the third read request, the memory control unit 122 receives at T12 the third internal read-request signal from the CPU interface 121. At this time, however, since the memory unit 130 is still busy taking care of the previous read request, the memory control unit 122 must wait until the memory unit 130 completes outputting the third block of data requested by the previous read request, i.e., until T21, and then issues successively a precharge-enable signal, an activate-enable signal, and a read-enable signal to the memory unit 130 for the third read request. In response, the memory unit 130 starts at T30 to output the four blocks of data requested by the third read request signal.

For comparison purposes, the foregoing read requests are performed by the method and system of the invention to compare the difference in performance between the invention and the prior art.

Referring to FIG. 5B (the invention), in the case of the invention, the CPU 110 also issues three read requests successively at T1, T4, and T7 via the ADS and REQ data lines. When the CPU interface 221 receives the first read request from the CPU 110, it promptly issues at T3 the corresponding internal read-request signal via the DADS data line to the memory control unit 222. Subsequently when the second read request is received, the CPU interface 221 promptly issues at T6 the corresponding internal read-request signal to the memory control unit 222 without waiting until the CPU 110 issues the L1 write-back signal of the second read request. In addition, since the data requested by the second read request are located in a closed page in the memory unit 130, the CPU interface 221 also issues concurrently at T6 a cross-page signal via the CROS/PG data line to the memory control unit 222. Furthermore, when the CPU interface 221 receives the third read request from the CPU 110, the CPU interface 221 promptly issues at T9 the corresponding internal read-request signal to the memory control unit 222. In addition, since the data requested by the third read request are located in a closed page in the memory unit 130, the CPU interface 221 also issues concurrently at T9 a cross-page signal via the CROS/PG data line to the memory control unit 222.

The memory control unit 222, in response to the first internal read-request signal from the CPU interface 221, first checks that the requested data are located in the start page of the memory unit 130. Then, after two clock cycles, i.e., at T5, the memory control unit 222 issues an activate-enable signal to the memory unit 130. Subsequently at T6, the memory control unit 222 receives the second internal read-request signal and the accompanying cross-page signal from the CPU interface 221. In response, the memory control unit 222 issues at T8 a read-with-auto-precharge enable signal to the memory unit 130 for the second read request. In this preferred embodiment, a read-with-auto-precharge enable signal is implemented by setting the MA10 data line at a HIGH-voltage logic state, whereas, a read-enable signal (without auto precharge) is implemented by setting the MA10 data line at a LOW-voltage logic state. Then, after a latency of two clock cycles after the read-with-auto-precharge enable signal is issued, i.e., at T10, the memory unit 130 starts to output the requested four blocks of data via the MD data line, and immediately after outputting the requested data is completed, performs an auto-precharging operation.

With respect to the second read request, the memory control unit 222 receives at T6 the second internal read-request signal from the CPU interface 221. In response, the memory control unit 222 first checks that the requested data are located in a closed page; then, the memory control unit 222 waits until outputting the data requested by the previous read request and the ensuing auto-precharging operation are entirely completed, i.e., until T14, and then issues an activate-enable signal to the memory unit 130. The activate-enable signal causes the memory unit 130 to open the page where the requested data are located. Subsequently, since the next internal read-request signal received at T9 is accompanied by a cross-page signal, it causes the memory control unit 222 to issue at T17 a read-with-auto-precharge enable signal rather than a normal read-enable signal to the memory unit 130. In response, the memory unit 130 starts at T19 to output the data requested by the second read request.

Furthermore, with respect to the third read request, the memory control unit 222 receives at T9 the third internal read-request signal from the CPU interface 221. In response, the memory control unit 222 waits until outputting the data requested by the previous read request and the ensuing auto-precharging operation are entirely completed, i.e., until T23, and then issues an activate-enable signal to the memory unit 130. Since the third internal read-request signal is the last one (in this assumed case), it causes the memory control unit 222 to issue at T26 a normal read-enable signal rather than a read-with-auto-precharge enable signal to the memory unit 130. After a latency of two clock cycles, i.e., at T28, the memory unit 130 starts to output the four blocks of data requested by the third read request.

By comparing FIG. 5B of the invention with FIG. 5A of the prior art, it can be seen that the prior art requires a total of 35 clock cycles to complete the overall read operation on the memory unit 130 by the three successively issued read requests from the CPU 110. By contrast, the invention requires only 33 clock cycles. It is apparent that the invention has a higher memory access performance than the prior art.

Figure 6A:
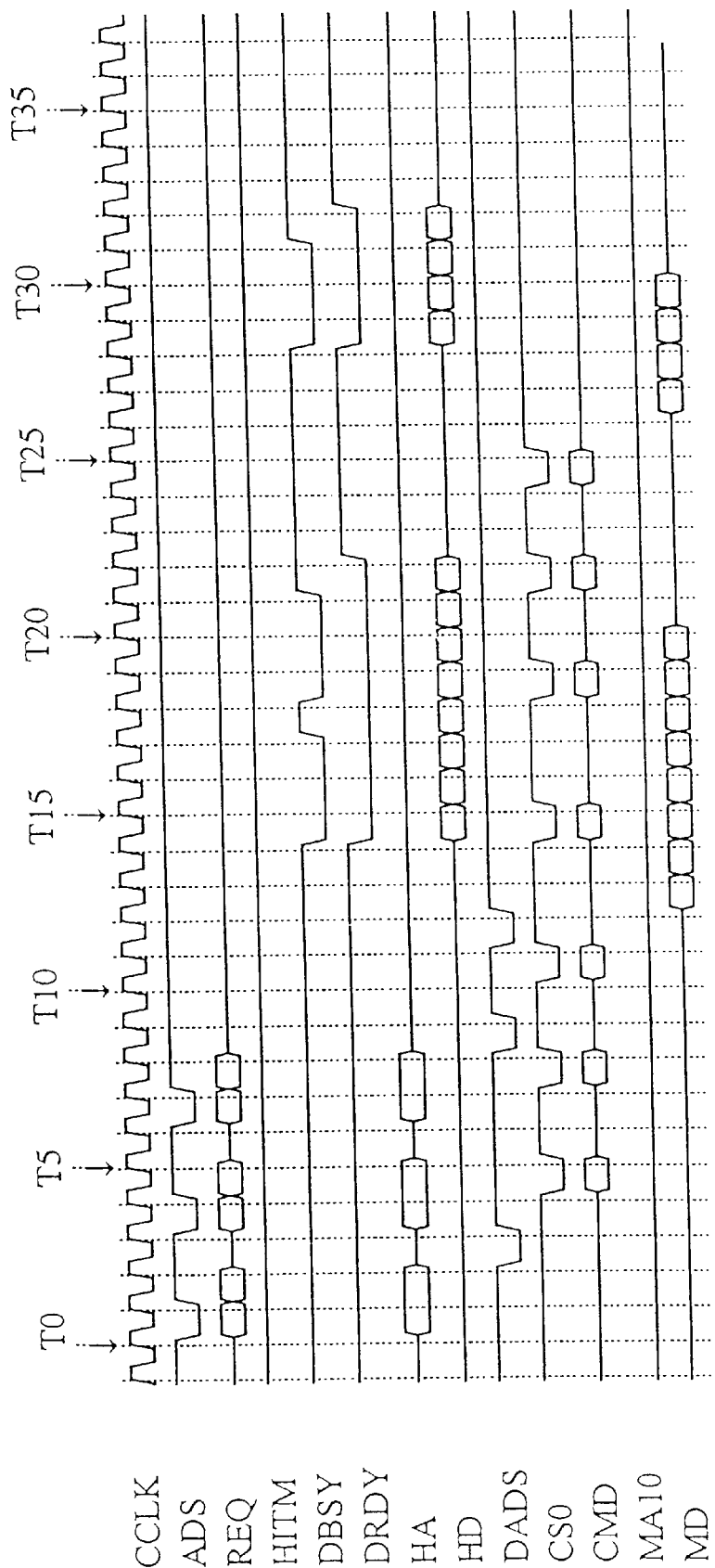
FIGS. 6A–6B are signal timing diagrams of the prior art and the invention, respectively, which are used to depict a second performance comparison example between the invention and the prior art.
Figure 6B:
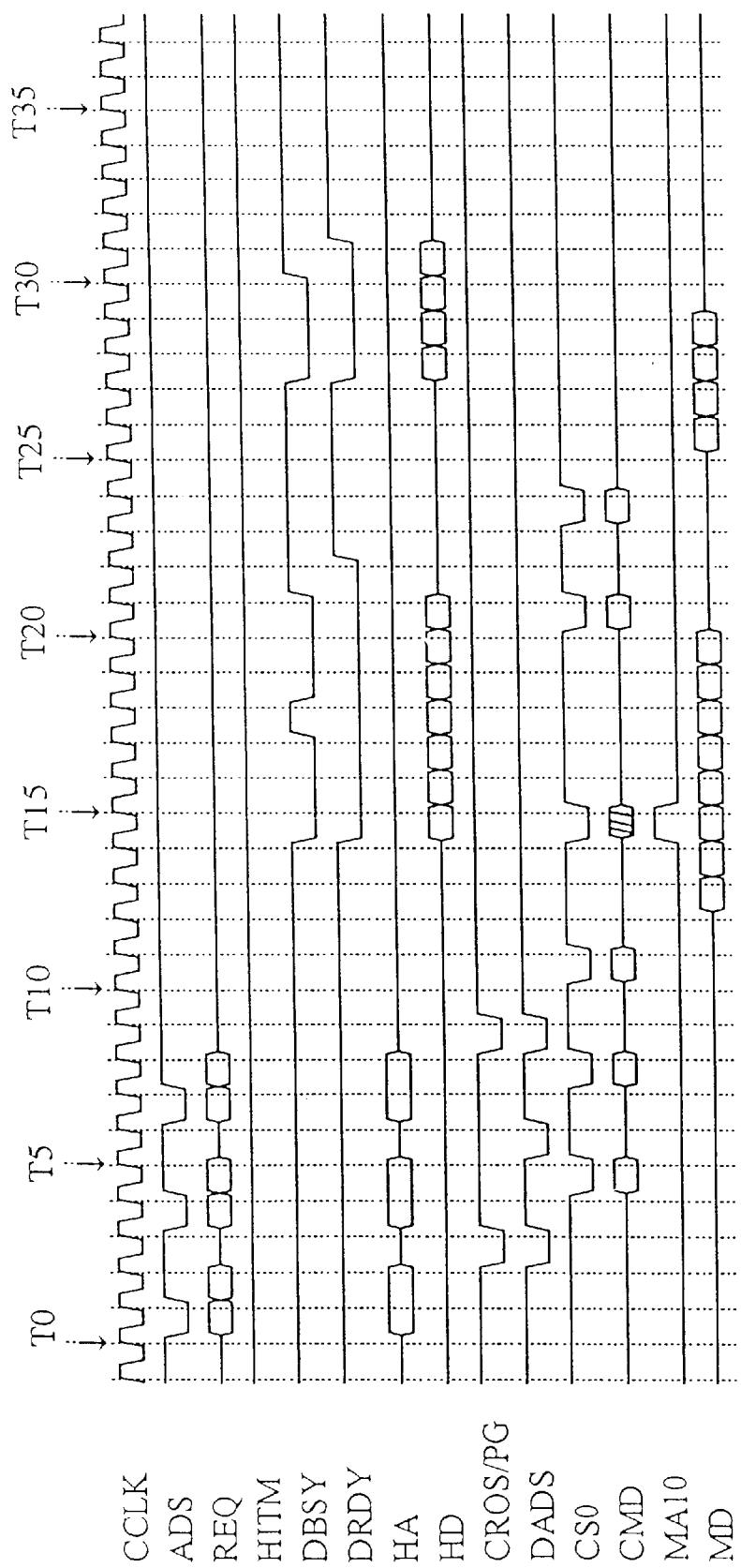

Second Performance Comparison Example (FIGS. 6A and 6B)

In the example of FIGS. 6A–6B, it is assumed that the CPU 110 issues successively three read requests to the memory unit 130, with the data requested by the first read request being located in a closed page, the data requested by the second read request being located in a currently opened page, and the data requested by the third read request being located in another closed page.

Referring to FIG. 6A (the prior art), in the case of the prior art, the CPU 110 issues three read requests successively at T1, T4, and T7 via the ADS, REQ, and HA data lines. By the prior art of FIG. 1, when the CPU interface 121 receives the first read request from the CPU 110, the CPU interface 121 promptly issues at T3 the corresponding internal read-request signal to the memory control unit 122 without waiting until the CPU 110 the L1 write-back signal of the first read request. In response to the second and third read requests, however, the CPU interface 121 waits until the CPU 110 issues the respective L1 write-back signals of the second and third read requests, i.e., respectively until T9 and T12, and then issues the corresponding internal read-request signals to the memory control unit 122.

The memory control unit 122, in response to the first internal read-request signal from the CPU interface 121, first checks that the requested data are located in a closed page in the memory unit 130; then, after two clock cycles, i.e., at T5, the memory control unit 122 starts to issue successively a precharge-enable signal, an activate-enable signal, and a read-enable signal to the memory unit 130. In response to these signals, the memory unit 130 first opens the page where the requested data are located; and then, after a latency of two clock cycles, i.e., at T13, the memory unit 130 starts to output the requested four blocks of data via the MD data line. These data are then transferred via the memory access control system 120 to the CPU 110. With respect to the second read request, the memory control unit 122 receives at T9 the second internal read-request signal from the CPU interface 121. In response, the memory control unit 122 first checks that the requested data are located in a currently opened page; and consequently, the memory control unit 122 issues at T15 a read-enable signal via the CMD data line to the memory unit 130. In response, the memory unit 130 starts at T17 to output the requested data. Furthermore, with respect to the third read request, the memory control unit 122 receives at T12 the third internal read-request signal from the CPU interface 121. At this time, however, since the memory unit 130 is still busy taking care of the previous read request, the memory control unit 122 must wait until the memory unit 130 completes outputting the third block of data requested by the previous read request, i.e., until T19, and then start to issue successively a precharge-enable signal, an activate-enable signal, and a read-enable signal to the memory unit 130 for the third read request. In response to these signals, the memory unit 130 first opens the page where the requested data are located; and then, after a latency of two clock cycles, i.e., at T27, the memory unit 130 starts to output the four blocks of data requested by the third read request.

For comparison purposes, the foregoing read requests are performed by the method and system of the invention to compare the difference in performance between the invention and the prior art.

Referring to FIG. 6B (the invention), in the case of the invention, the CPU 110 also issues three read requests successively at T1, T4, and T7 via the ADS and REQ data lines. When the CPU interface 221 receives the first read request from the CPU 110, it promptly issues at T3 the corresponding internal read-request signal via the DADS data line to the memory control unit 222. In addition, since the requested data are located in a closed page, the CPU interface 221 also issues concurrently at T3 a cross-page signal via the CROS/PG data line to the memory control unit 222. Subsequently when the second read request is received, the CPU interface 221 promptly issues at T6 the corresponding internal read-request signal via the DADS data line to the memory control unit 222 without waiting until the CPU 110 issues the L1 write-back signal of the second read request. Furthermore, when the CPU interface 221 receives the third read request from the CPU 110, the CPU interface 221 promptly issues at T9 the corresponding internal read-request signal via the DADS data line to the memory control unit 222. In addition, since the data requested by the third read request are located in a closed page in the memory unit 130, the CPU interface 221 also issues concurrently at T9 a cross-page signal via the CROS/PG data line to the memory control unit 222.

The memory control unit 222, in response to the first internal read-request signal from the CPU interface 221, first checks that the requested data are located in a closed page in the memory unit 130; and consequently, after two clock cycles, i.e., at T5, the memory control unit 222 starts to issue successively a precharge-enable signal, an activate-enable signal, and a read-enable signal to the memory unit 130. In response to these signals, the memory unit 130 starts at T13 to output the requested four blocks of data via the MD data line.

With respect to the second read request signal, the memory control unit 222 receives at T6 the second internal read-request signal from the CPU interface 221. In response, the memory control unit 222 first checks that the requested data are located in a currently opened page in the memory unit 130. Then, the memory control unit 222 waits until the memory unit 130 completes outputting the third block of data for the previous read request, i.e., until T15, and then issues at T15 a read-with-auto-precharge enable signal via the CMD and CS0 data lines to the memory unit 130 (a read-with-auto-precharge enable signal rather than a normal read-enable signal is issued because a cross-page signal is received together with the second internal read-request signal). In response, the memory unit 130 starts at T17 to output the requested data, and immediately after outputting the requested data is complete, the memory unit 130 performs an auto-precharging operation.

Furthermore, with respect to the third read request, the memory control unit 222 receives at T9 the third internal read-request signal from the CPU interface 221. In response, the memory control unit 222 waits until outputting the data requested by the previous read request and the ensuing auto-precharging operation are entirely completed, i.e., until T21, and then issues an activate-enable signal to the memory unit 130. Since the third internal read-request signal is the last one (in this assumed case), it causes the memory control unit 222 to issue at T24 a normal read-enable signal rather than a read-with-auto-precharge enable signal to the memory unit 130. After a latency of two clock cycles, i.e., at T26, the memory unit 130 starts to output the four blocks of data requested by the third read request via the MD data line.

By comparing FIG. 6B of the invention with FIG. 6A of the prior art, it can be seen that the prior art requires a total of 32 clock cycles to complete the overall read operation on the memory unit 130 by the three, successively issued read requests from the CPU 110. In contrast, the invention requires only 31 clock cycles. It is apparent that the invention is higher in memory access performance than the prior art.

Figure 7A:
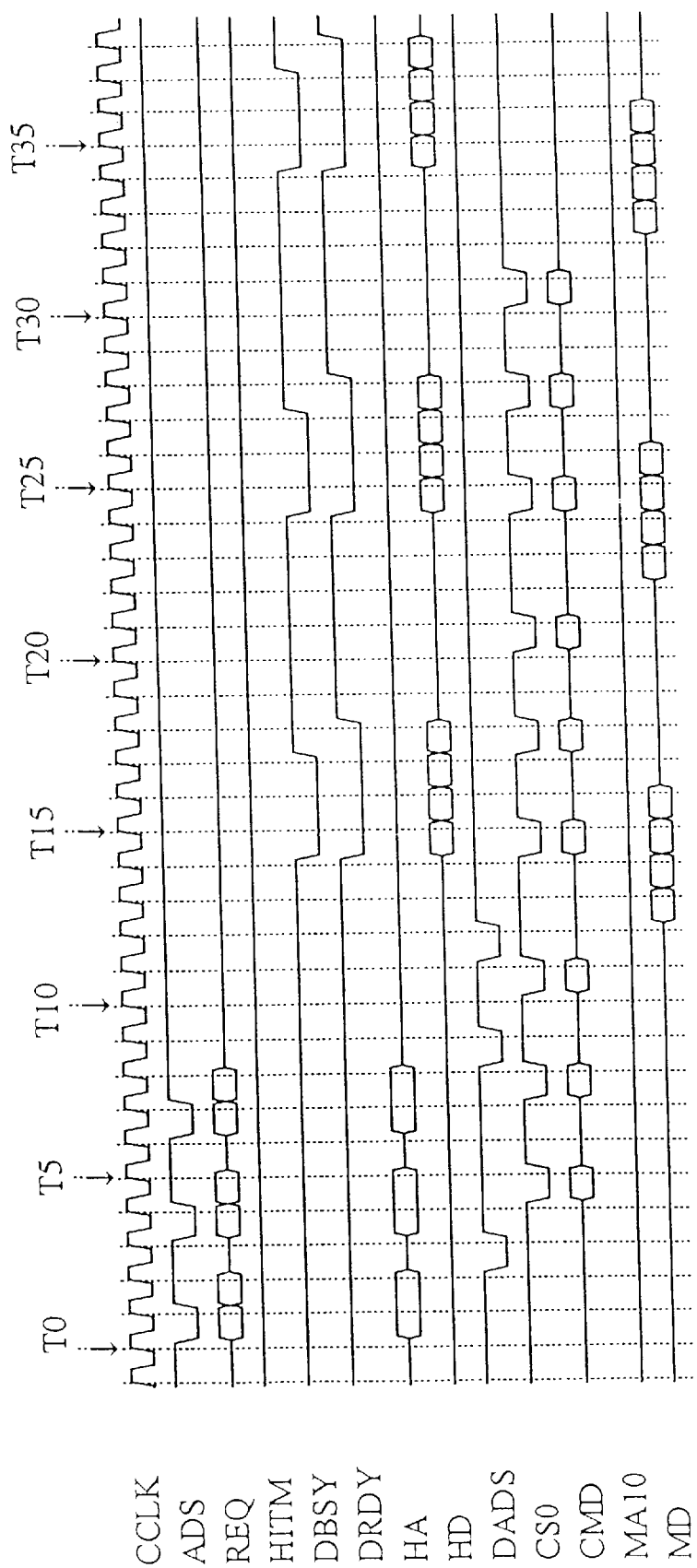
FIGS. 7A–7B are signal timing diagrams, respectively of the prior art and the invention, respectively, which are used to depict a third performance comparison example between the invention and the prior art.
Figure 7B:
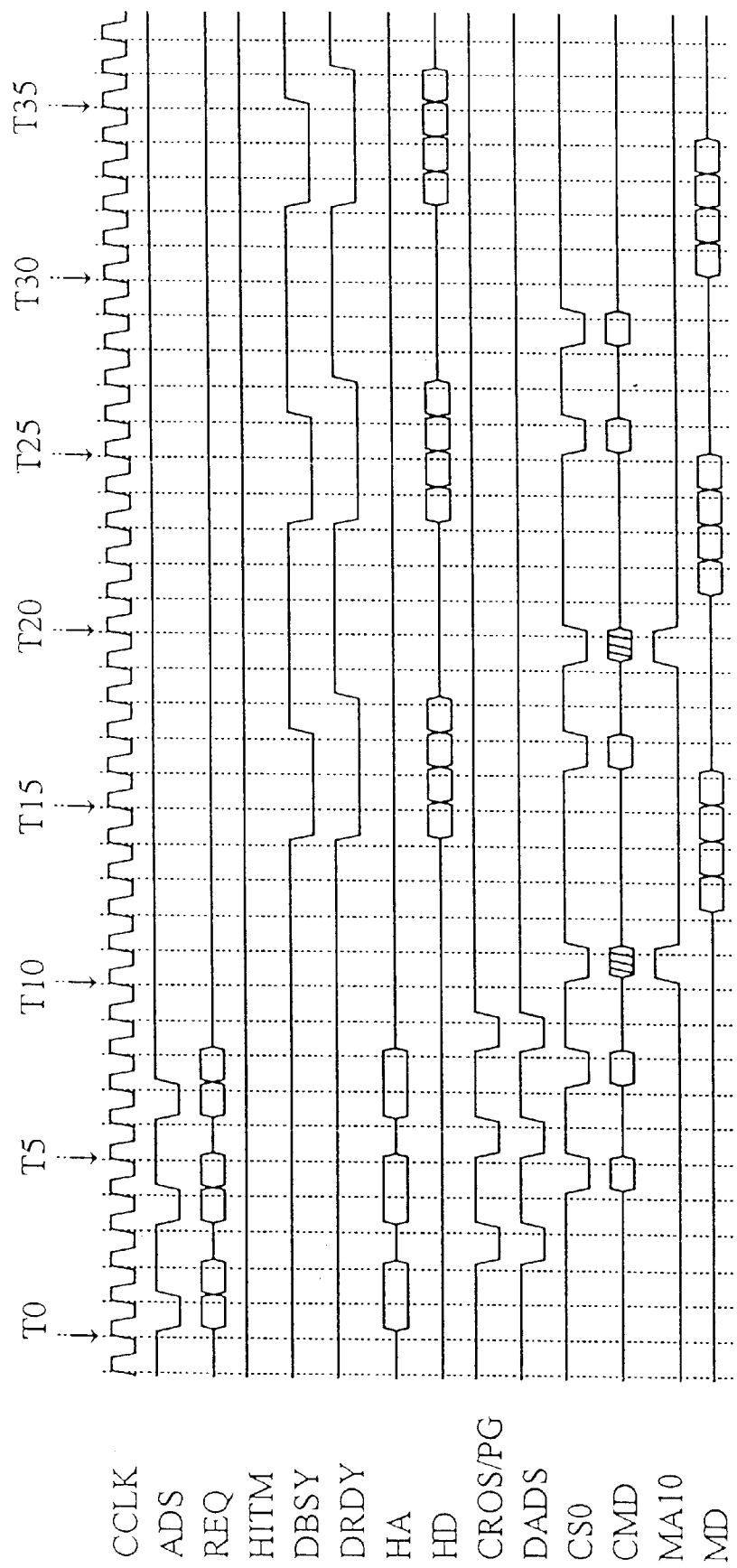

Third Performance Comparison Example (FIGS. 7A and 7B)

In the example of FIGS. 7A–7B, it is assumed that the CPU 110 issues successively three read requests to the memory unit 130, with the data requested by these three read requests being all located in closed pages in the memory unit 130.

Referring to FIG. 7A (the prior art), in the case of the prior art, the CPU 110 issues three read requests successively at T1, T4, and T7 via the ADS, REQ, and HA data lines. By the prior art of FIG. 1, when the CPU interface 121 receives the first read request from the CPU 110, the CPU interface 121 promptly issues at T3 the corresponding internal read-request signal to the memory control unit 122 without waiting until the CPU 110 issues the L1 write-back signal of the first read request. In response to the second and third read requests, however, the CPU interface 121 waits until the CPU 110 issues the respective L1 write-back signals of the second and third read requests, i.e., respectively until T9 and T12, and then issues the corresponding internal read-request signals to the memory control unit 122.

The memory control unit 122, in response to the first internal read-request signal from the CPU interface 121, first checks that the requested data are located in a closed page in the memory unit 130; then, after two clock cycles, i.e., at T5, the memory control unit 122 starts to issue successively a precharge-enable signal, an activate-enable signal, and a read-enable signal via the CMD and CS0 data lines to the memory unit 130. In response to these signals, the memory unit 130 first opens the page where the requested data are located; then, after a latency of two clock cycles, i.e., at T13, the memory unit 130 starts to output the requested four blocks of data via the MD data line. These data are then transferred via the memory access control system 120 to the CPU 110. With respect to the second read request, the memory control unit 122 receives at T9 the second internal read-request signal from the CPU interface 121. In response, the memory control unit 122 first checks that the requested data are located in another closed page in the memory unit 130. The memory control unit 122 waits until the memory unit 130 completes outputting the third block of data for the previous read request, i.e., until T15, and then issues successively a precharge-enable signal, an activate-enable signal, and a read-enable signal via the CMD and CS0 data lines to the memory unit 130 for the second read request. In response, the memory unit 130 starts at T23 to output the requested data. Furthermore, with respect to the third read request signal, the memory control unit 122 receives at T12 the third internal read-request signal from the CPU interface 121. At this time, however, since the memory unit 130 is still busy taking care of the previous read request, the memory control unit 122 must wait until the memory unit 130 completes outputting the third block of data requested by the previous read request, i.e., until T25, and then start to issue successively a precharge-enable signal, an activate-enable signal, and a read-enable signal to the memory unit 130 for the third read request. In response to these signals, the memory unit 130 first opens the page where the requested data are located; and then, after a latency of two clock cycles, i.e., at T33, the memory unit 130 starts to output the four blocks of data requested by the third read request.

For comparison purpose, the foregoing read requests are performed by the method and system of the invention to compare the difference in performance between the invention and the prior art.

Referring to FIG. 7B (the invention), in the case of the invention, the CPU 110 also issues three read requests successively at T1, T4, and T7. When the CPU interface 221 receives the first read request from the CPU 110, it promptly issues at T3 the corresponding internal read-request signal via the DADS data line to the memory control unit 222. In addition, since the requested data are located in a closed page, the CPU interface 221 also issues concurrently at T3 a cross-page signal via the CROS/PG data line to the memory control unit 222. Subsequently when the second read request is received, the CPU interface 221 promptly issues at T6 the corresponding internal read-request signal via the DADS data line to the memory control unit 222 without waiting until the CPU 110 issues the L1 write-back signal of the second read request; and in addition, since the requested data are located in a closed page, the CPU interface 221 also issues concurrently at T6 a cross-page signal via the CROS/PG data line to the memory control unit 222. Furthermore, when the CPU interface 221 receives the third read request from the CPU 110, the CPU interface 221 promptly issues at T9 the corresponding internal read-request signal via the DADS data line to the memory control unit 222 without waiting until the CPU 110 issues the L1 write-back signal of the third read request. In addition, since the requested data are located in a closed page, the CPU interface 221 also issues concurrently at T9 a cross-page signal via the CROS/PG data line to the memory control unit 222.

The memory control unit 222, in response to the first internal read-request signal and the accompanying cross-page signal from the CPU interface 221, first checks that the requested data are located in a closed page in the memory unit 130. Then, after two clock cycles, i.e., at T5, the memory control unit 222 starts to issue successively a precharge-enable signal and an activate-enable signal to the memory unit 130. During this time, since the next internal read-request signal (i.e., the second internal read-request signal) and the accompanying cross-page signal have already been received, it causes the memory control unit 222 to issue at T10 a read-with-auto-precharge enable signal rather than a normal read-enable signal to the memory unit 130. After a latency of two clock cycles, i.e., at T13, the memory unit 130 starts to output the four blocks of data requested by the first read request.

With respect to the second read request, the memory control unit 222 receives at T6 the second internal read-request signal and the accompanying cross-page signal from the CPU interface 221. In response, the memory control unit 222 first checks that the requested data are located in a closed page in the memory unit 130. The memory control unit 222 waits until outputting the data requested by the previous read request and the ensuing auto-precharging operation are entirely completed, i.e., until T17, and then issues an activate-enable signal via the CMD and CS0 data lines to the memory unit 130. During this time, since the next internal read-request signal (i.e., the third internal read-request signal) and the accompanying cross-page signal have already been received, it causes the memory control unit 222 to issue at T20 a read-with-auto-precharge enable signal to the memory unit 130. Then, at T22, the memory unit 130 starts to output the requested data, and performs an auto-precharging operation immediately after the requested data is completely outputted.

Furthermore, with respect to the third read request, the memory control unit 222 receives the third internal read-request signal from the CPU interface 221 at T9. In response, the memory control unit 222 waits until the memory unit 130 completes outputting the data requested by the previous read request and ensuing auto-precharging operation, and then starts to issue an activate-enable signal to the memory unit 130 at, i.e., T31. Since the third internal read-request signal is the last one (in this assumed case), it causes the memory control unit 222 to issue at T29 a normal read-enable signal, rather than a read-with-auto-precharge enable signal, to the memory unit 130. After a latency of two clock cycles, i.e., at T31, the memory unit 130 starts to output the four blocks of data requested by the third read request via the MD data line.

By comparing FIG. 7B of the invention with FIG. 7A of the prior art, it can be seen that the prior art requires a total of 38 clock cycles to complete the overall read operation on the memory unit 130 by the three successively issued read requests from the CPU 110. By contrast, the invention requires only 36 clock cycles. It is apparent that the invention has a higher memory access performance than the prior art.

Figure 8A:
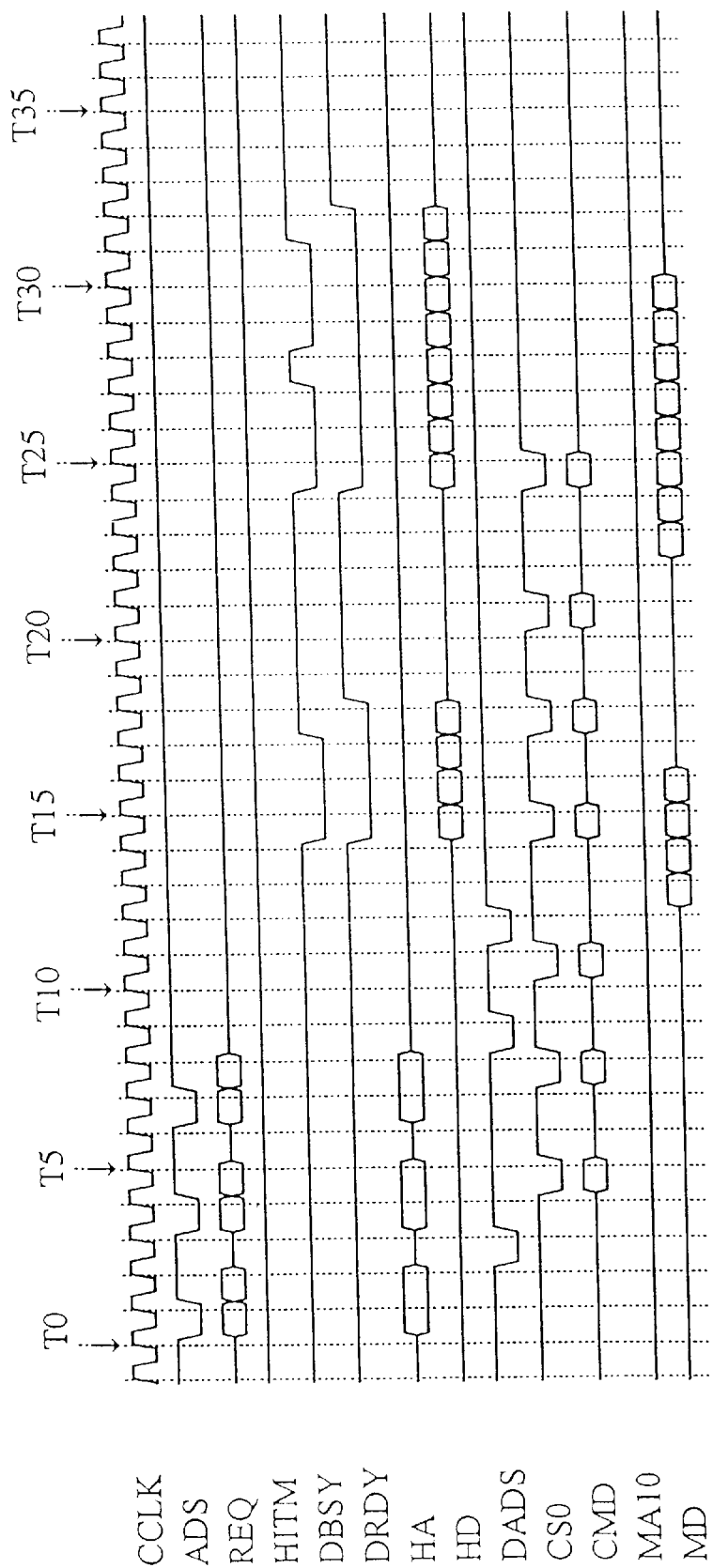
FIGS. 8A–8B are signal timing diagrams of the prior art and the invention, respectively, which are used to depict a fourth performance comparison example between the invention and the prior art.
Figure 8B:
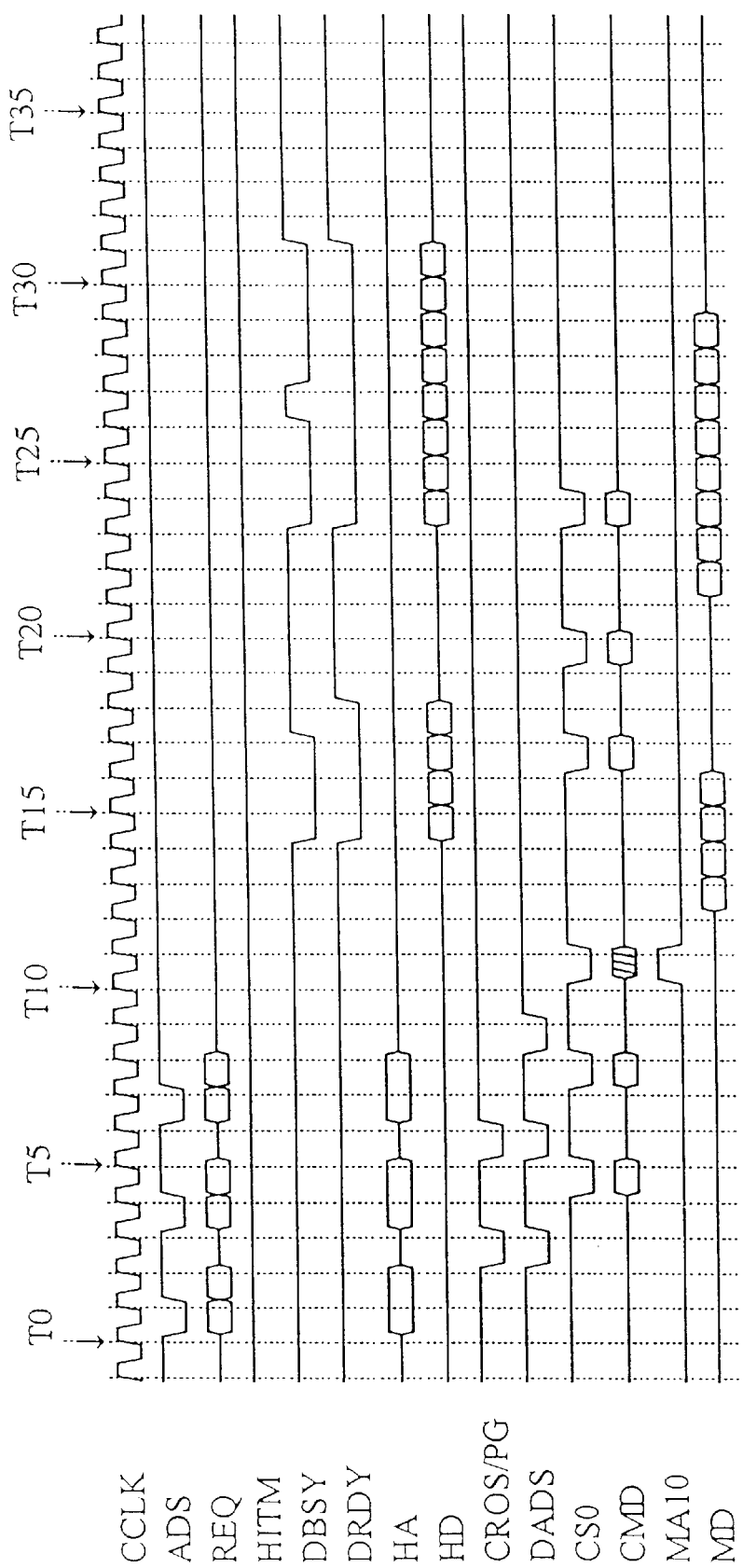

Fourth Performance Comparison Example (FIGS. 8A and 8B)

In the example of FIGS. 8A–8B, it is assumed that the CPU 110 issues successively three read requests to the memory unit 130, with the data requested by the first and second read requests being respectively located in closed pages in the memory unit 130, and the data requested by the third read request being located in a currently opened page in the memory unit 130.

Referring to FIG. 8A (the prior art), in the case of the prior art, the CPU 110 issues three read requests successively at T1, T4, and T7 via the ADS, REQ, and HA data lines. By the prior art of FIG. 1, when the CPU interface 121 receives the first read request from the CPU 110, the CPU interface 121 promptly issues at T3 the corresponding internal read-request signal to the memory control unit 122 without waiting until the CPU 110 issues the L1 write-back signal of the first read request. In response to the second and third read requests, however, the CPU interface 121 waits until the CPU 110 issues the respective L1 write-back signals of the second and third read requests, i.e., respectively until T9 and T12, and then issue the corresponding internal read-request signals to the memory control unit 122.

The memory control unit 122, in response to the first internal read-request signal from the CPU interface 121, first checks that the requested data are located in a closed page in the memory unit 130. Then, after two clock cycles, i.e., at T5, the memory control unit 122 starts to issue successively a precharge-enable signal, an activate-enable signal, and a read-enable signal via the CMD and CS0 data lines to the memory unit 130. In response to these signals, the memory unit 130 first opens the page where the requested data are located. After a latency of two clock cycles, i.e., at T13, the memory unit 130 starts to output the requested four blocks of data via the MD data line. These data are then transferred via the memory access control system 120 to the CPU 110. With respect to the second read request, the memory control unit 122 receives at T9 the second internal read-request signal from the CPU interface 121. In response, the memory control unit 122 first checks that the requested data are located in another closed page in the memory unit 130. The memory control unit 122 waits until the memory unit 130 completes outputting the third block of data for the previous read request, i.e., until T15, and then issue successively a precharge-enable signal, an activate-enable signal, and a read-enable signal via the CMD and CS0 data lines to the memory unit 130 for the second read request. In response, the memory unit 130 starts at T23 to output the requested data. Furthermore, with respect to the third read request signal, the memory control unit 122 receives at T12 the third internal read-request signal from the CPU interface 121. At this time, however, since the memory unit 130 is still busy taking care of the previous read request, the memory control unit 122 must wait until the memory unit 130 completes outputting the third block of data requested by the previous read request, i.e., until T25, and then start to issue a read-enable signal to the memory unit 130 for the third read request. In response, the memory unit 130 starts at T27 to output the four blocks of data requested by the third read request via the MD data line.

For comparison purposes, the foregoing read requests are performed by the method and system of the invention to compare the difference in performance between the invention and the prior art.

Referring to FIG. 8B (the invention), in the case of the invention, the CPU 110 also issues three read requests successively at T1, T4, and T7. When the CPU interface 221 receives the first read request from the CPU 110, it promptly issues at T3 the corresponding internal read-request signal via the DADS data line to the memory control unit 222. In addition, since the requested data are located in a closed page, the CPU interface 221 also issues concurrently at T3 a cross-page signal via the CROS/PG data line to the memory control unit 222. Subsequently when the second read request is received, the CPU interface 221 promptly issues at T6 the corresponding internal read-request signal via the DADS data line to the memory control unit 222 without waiting until the CPU 110 issues the L1 write-back signal of the second read request. In addition, since the requested data are located in a closed page, the CPU interface 221 issues concurrently at T6 a cross-page signal via the CROS/PG data line to the memory control unit 222. Furthermore, when the CPU interface 221 receives the third read request from the CPU 110, the CPU interface 221 promptly issues at T9 the corresponding internal read-request signal via the DADS data line to the memory control unit 222 (since the requested data are located in an opened page, no cross-page signal is issued together with the internal read-request signal).

The memory control unit 222, in response to the first internal read-request signal and the accompanying cross-page signal from the CPU interface 221, first checks that the requested data are located in a closed page in the memory unit 130; and then, after two clock cycles, i.e., at T5, the memory control unit 222 starts to issue successively a precharge-enable signal and an activate-enable signal to the memory unit 130. During this time, since the next internal read-request signal (i.e., the second internal read-request signal) and the accompanying cross-page signal have already been received, the memory control unit 222 starts at T10 to issue a read-with-auto-precharge enable signal rather than a normal read-enable signal to the memory unit 130. After a latency of two clock cycles, i.e., at T13, the memory unit 130 starts to output the four blocks of data requested by the first read request via the MD data line.

With respect to the second read request, the memory control unit 222 receives at T6 the second internal read-request signal from the CPU interface 221. In response, the memory control unit 222 first checks that the requested data are located in a closed page in the memory unit 130. Then, the memory control unit 222 waits until the auto-precharging operation during the previous read operation is completed, i.e., until T17, and then issues an activate-enable signal via the CMD and CS0 data lines to the memory unit 130. During this time, since the third internal read-request signal has already been received (with no accompanying cross-page signal), it causes the memory control unit 222 to issue at T20 a normal read-enable signal rather than a read-with-auto-precharge enable signal to the memory unit 130. At T22, the memory unit 130 starts to output the requested data requested by the second read request.

Furthermore, with respect to the third read request, the memory control unit 222 receives at T9 the third internal read-request signal from the CPU interface 221. In response, the memory control unit 222 waits until the memory unit 130 completes outputting the third block of data requested by the previous read request, i.e., until T24, and then starts to issue a normal read-enable signal to the memory unit 130 (a normal read-enable signal is issued because the third read request is the last one of the read requests). Then, after a latency of two clock cycles, i.e., at T26, the memory unit 130 starts to output the four blocks of data requested by the third read request via the MD data line.

By comparing FIG. 8B of the invention with FIG. 8A of the prior art, it can be seen that the prior art requires a total of 32 clock cycles to complete the overall read operation on the memory unit 130 by the three successively issued read requests from the CPU 110. By contrast, the invention requires only 31 clock cycles. It is apparent that the invention has a higher memory access performance than the prior art.

CONCLUSION

In conclusion, the method and system of the invention is characterized by the prompt transfer of each read request from the CPU to the memory control unit right after it is issued and without waiting until the CPU issues the L1 write-back signal of the current read request. Moreover, the method of the invention is further characterized in that, in the event that the data requested by the next read request are located in a closed page, the memory control unit issues a read-with-auto-precharge enable signal rather than a normal read-enable signal for the current read request. Therefore, the invention can help reduce the waiting periods required by the CPU and also help reduce the period of precharging operations. As a result, the overall memory access performance by the CPU can be enhanced. The overall system performance of the computer system is also enhanced.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A memory access control system for controlling a memory access operation by a CPU of a memory unit, the CPU being capable of issuing a plurality of read requests each time the CPU intends to read data from the memory unit, and the memory unit being of a type having an auto-precharge feature and partitioned into a plurality of pages for data storage, the memory access control system comprising:

a CPU interface coupled to the CPU, which is capable of promptly issuing an internal read-request signal in response to each read request from the CPU without waiting for a corresponding write-back signal being received after a certain plurality of clock cycles and is further capable of simultaneously generating a cross-page signal with the internal read-request signal in the event that data requested by the current read request are located in a closed page in the memory unit; and a memory control unit coupled between the CPU interface and the memory unit, which is capable of issuing a normal read-enable signal to the memory unit in the event that a next internal read-request signal is received without having an accompanying cross-page signal before the read operation for the current read request is performed, and is further capable of issuing a read-with-auto-precharge enable signal to the memory unit in the event that the next internal read-request signal is received together with the accompanying cross-page signal before the read operation for the current read request is performed, the read-with-auto-precharge enable signal causing the memory unit to perform an auto-precharging operation after the read operation for the current read request is completed, wherein the memory control unit is further capable of, in response to the internal read-request signal with the accompanying cross-page signal from the CPU interface, issuing an activate-enable signal to the memory unit prior to the issuing of the normal read-enable signal, or the read-with-auto-precharge enable signal.

2. The system of claim 1, wherein the memory unit is further capable of issuing a precharge-enable signal to the memory unit prior to issuing the activate-enable signal in the event that the next internal read-request signal is received with the accompanying cross-page signal after the read operation for the current read request is completed.

3. The system of claim 1, wherein the memory unit is a synchronous dynamic random access memory (SDRAM).

4. A memory access control method for controlling a memory access operation by a CPU to a memory unit, the CPU being capable of issuing a read request each time the CPU intends to read data from the memory unit, and the memory unit being of the type having an auto-precharge feature and partitioned into a plurality of pages for data storage, the method comprising the steps of:

in response to the current read request from the CPU, issuing a normal read-enable signal to the memory unit, without waiting for a corresponding write-back signal being received after a certain plurality of clock cycles, to enable the memory unit to perform a read operation for the current read request;

in the event that a next read request is received before the read operation for the current read request signal is performed and also that data requested by the next read request are located in a closed page in the memory unit, issuing a read-with-auto-precharge enable signal to the memory unit to enable the memory unit to perform an auto-precharging operation after the read operation for the current read request is completed, wherein the read-with-auto-precharge enable signal indicates that the read request is accompanied with a cross-page signal for enabling the auto-precharging operation;

promptly issuing a cross-page signal in the event that the data requested by the current read request are located in a closed page in the memory unit; and issuing the read-with-auto-precharge enable signal to the memory unit in the event that the next read request is received with an accompanying cross-page signal before the read operation for the current read request is performed.

5. The method of claim 4, further comprising, in the event that the current read request is received with the accompanying cross-page signal, the step of:

issuing an activate-enable signal to the memory unit prior to the issuing of the normal read-enable signal or the read-with-auto-precharge enable signal.

6. The method of claim 5, further comprising, in the event that the next read-request is received with the accompanying cross-page signal after the read operation for the current read request is completed, the step of:

issuing a precharge-enable signal to the memory unit prior to the issuing of the activate-enable signal.

7. A memory access control method for controlling a memory access operation by a CPU to a memory unit, the CPU being capable of issuing a read request each time the CPU intends to read data from the memory unit, and the memory unit being of the type having an auto-precharge feature and partitioned into a plurality of pages for data storage, the method comprising the steps of:

in response to the read request from the CPU, promptly issuing an internal read request signal, without waiting for a corresponding write-back signal being received after a certain plurality of clock cycles;

in the event that data requested by the read request are located in a closed page in the memory unit, simultaneously issuing a cross-page signal with the internal read request signal;

in the event that a next internal read signal is received without having an accompanying cross-page signal before the read request is performed, issuing a normal read-enable signal to the memory unit;

in response to the read-with-auto-precharge enable signal, performing an auto-precharging operation unit after the read request is completed; and in response to the next internal read request signal with the accompanying cross-page signal, issuing an activate-enable signal to the memory unit prior to the issuing of the normal read-enable signal or the read-with-auto-precharge enable signal.

8. The method of claim 7, further comprising:

in the event that the next internal read request signal is received with the accompanying cross-page signal after the read request is completed, issuing a precharge-enable signal to the memory unit prior to issuing the activate-enable signal.

9. A memory access control system for controlling a memory access operation by a CPU of a memory unit, the CPU being capable of issuing a plurality of read requests each time the CPU intends to read data from the memory unit, and the memory unit being of a type having an auto-precharge feature and partitioned into a plurality of pages for data storage, the memory access control system comprising:

a CPU interface coupled to the CPU, which is capable of promptly issuing an internal read-request signal in response to each read request from the CPU without waiting for a corresponding write-back signal being received after a certain plurality of clock cycles and is further capable of simultaneously generating a cross-page signal with the internal read-request signal in the event that data requested by the current read request are located in a closed page in the memory unit; and a memory control unit coupled between the CPU interface and the memory unit, which is capable of issuing a normal read-enable signal to the memory unit in the event that a next internal read-request signal is received without having an accompanying cross-page signal before the read operation for the current read request is performed, and is further capable of issuing a read-with-auto-precharge enable signal to the memory unit in the event that the next internal read-request signal is received together with the accompanying cross-page signal before the read operation for the current read request is performed, the read-with-auto-precharge enable signal causing the memory unit to perform an auto-precharging operation after the read operation for the current read request is completed.

10. A memory access control method for controlling a memory access operation by a CPU to a memory unit, the CPU being capable of issuing a read request each time the CPU intends to read data from the memory unit, and the memory unit being of the type having an auto-precharge feature and partitioned into a plurality of pages for data storage, the method comprising the steps of:

in response to the current read request from the CPU, issuing a normal read-enable signal to the memory unit, without waiting for a corresponding write-back signal being received after a certain plurality of clock cycles, to enable the memory unit to perform a read operation for the current read request; and in the event that a next read request is received before the read operation for the current read request signal is performed and also that data requested by the next read request are located in a closed page in the memory unit, issuing a read-with-auto-precharge enable signal to the memory unit to enable the memory unit to perform an auto-precharging operation after the read operation for the current read request is completed, wherein the read-with-auto-precharge enable signal indicates that the read request is accompanied with a cross-page signal for enabling the auto-precharging operation.

11. A memory access control method for controlling a memory access operation by a CPU to a memory unit, the CPU being capable of issuing a read request each time the CPU intends to read data from the memory unit, and the memory unit being of the type having an auto-precharge feature and partitioned into a plurality of pages for data storage, the method comprising the steps of:

in response to the read request from the CPU, promptly issuing an internal read request signal, without waiting for a corresponding write-back signal being received after a certain plurality of clock cycles;

in the event that data requested by the read request are located in a closed page in the memory unit, simultaneously issuing a cross-page signal with the internal read request signal;

in the event that a next internal read signal is received without having an accompanying cross-page signal before the read request is performed, issuing a normal read-enable signal to the memory unit; and in response to the read-with-auto-precharge enable signal, performing an auto-precharging operation unit after the read request is completed.

* * * * *